Sept. 9, 1969    D. L. SULLIVAN    3,465,405

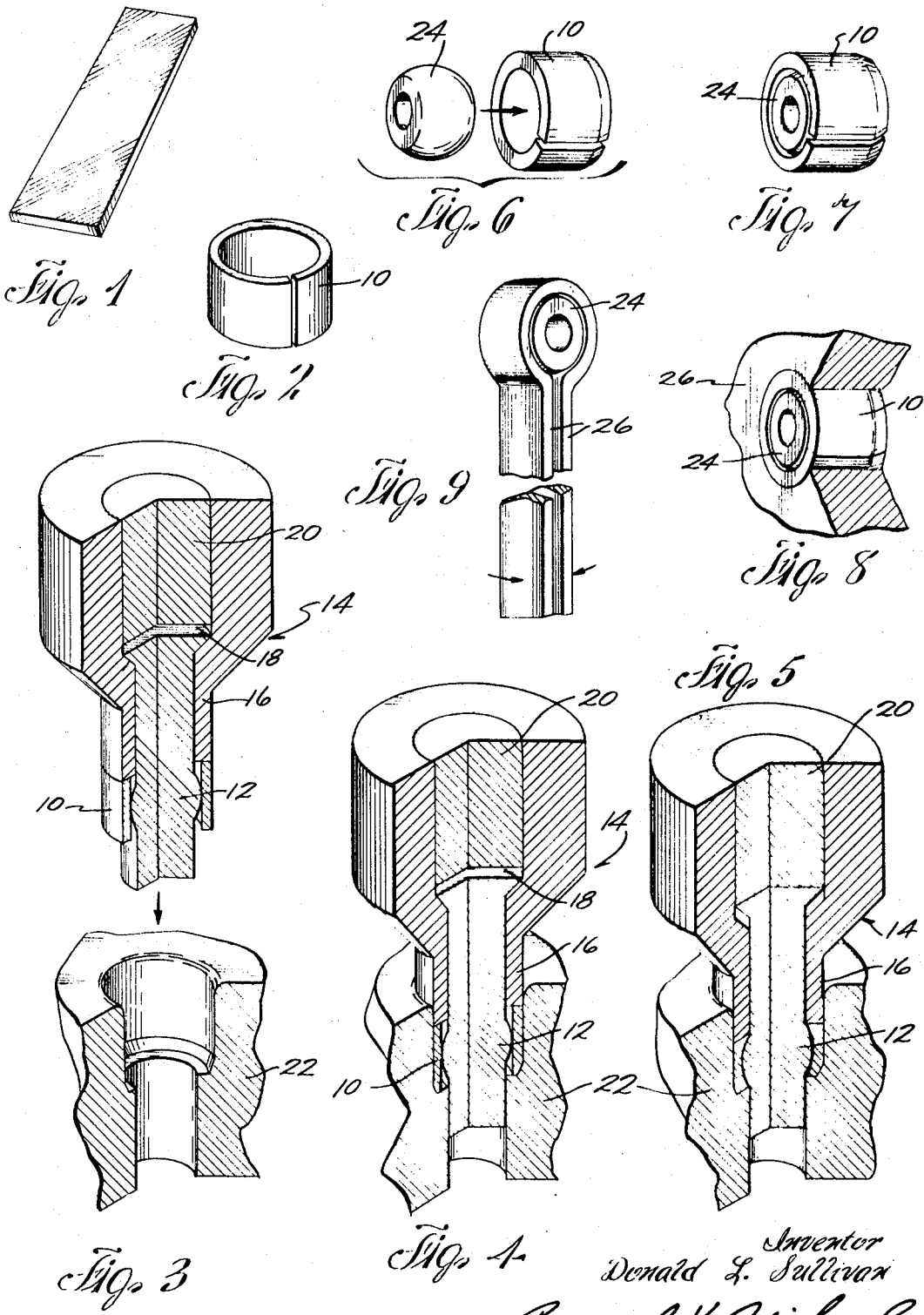

METHOD OF FABRICATING BALL BUSHING

Filed Oct. 11, 1966    2 Sheets-Sheet 2

Inventor
Donald L. Sullivan
Bayard H. Michael
Attorney

United States Patent Office 3,465,405
Patented Sept. 9, 1969

3,465,405
METHOD OF FABRICATING BALL BUSHING
Donald L. Sullivan, Oshkosh, Wis. 54901
Filed Oct. 11, 1966, Ser. No. 585,789
Int. Cl. B21d 39/00; B23p 11/02
U.S. Cl. 29—149.5                                     4 Claims

ABSTRACT OF THE DISCLOSURE

A metal strip is coined in a die to form it on a mandrel to accurately dimension the inside and outside. The metal is sprung when the mandrel is removed and the ball bushing is easily inserted. When the assembly is mounted the sprung metal is forced back to its formed dimensions and the ball bushing is accurately retained.

Figure 11:
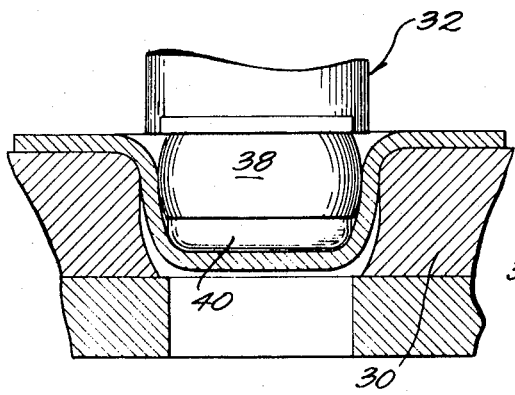

This invention relates to a ball bushing assembly and the method of fabricating the assembly.

Ball bushing assemblies comprise a metal or plastic bushing having a spherical exterior (hence the term "ball" bushing) mounted in a support or retainer having a spherical interior matched to the ball exterior so the bushing can move relative to the retainer for aligning purposes. Generally the retainer has been formed on the ball with the resulting requirement that the ball have a true spherical surface to insure the ability of the assembly to be self-aligning. This method of fabrication results in a high quality but rather costly bearing. Another method has formed a strip with a suitable "groove," cut the strip to length and then wrapped the strip on the ball. This method has problems in obtaining a proper joint at the butted ends of the strip without too much or too little clearance between the ball and retainer. Some cold formed retainers have been used but require further work after the ball is placed in the retainer. Generally the ball bushing assemblies available are of high quality, which is not necessary in many uses, and a reduction in cost and quality would be welcome in many present uses and would open new markets for these bearings.

The principal object of this invention is to simplify the fabrication of ball bushing assemblies.

Another object is to lower the cost of manufacturing ball bushing assemblies even at a reduction in quality.

My method forms a strip into a ring which is then cold formed on a mandrel to obtain the desired interior spherical surface. The formed retainer is then removed which spreads the butted ends and lets the bushing ball be inserted. The bushing remains somewhat loose until the ring is press fitted into its mounting and the press fit closes the spread-apart ends. Since the ends match perfectly due to the forming operation the ring can be subjected to great pressures without binding the ball. In the case of a flange mounted retainer the process draws, stamps, and forms the retainer which is then opened for removal from the mandrel. The retainer in this instance is reclosed prior to insertion of the ball. With either type of mounting the retainer is formed on a mandrel and the need for a true spherical surface on the truncated ball is eliminated. So long as the ball surface is generally spherical and not oversized the desired aligning features are obtained while any spaces between the ball and retainer can function as oil reservoirs. The ball can, therefore, be considerably cheaper and can be made out of any material since there is no forming on the ball which requires high ball strength. The retainer is cheaper to make and retains a remarkably high quality.

Figure 12:
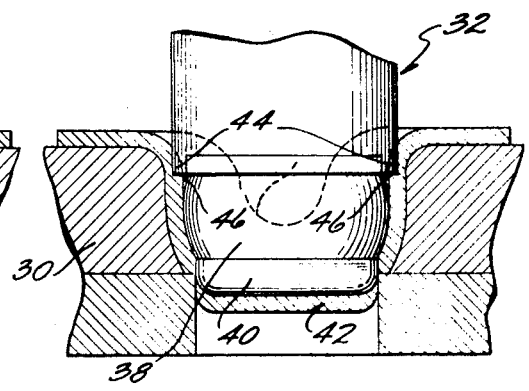
Figure 13:
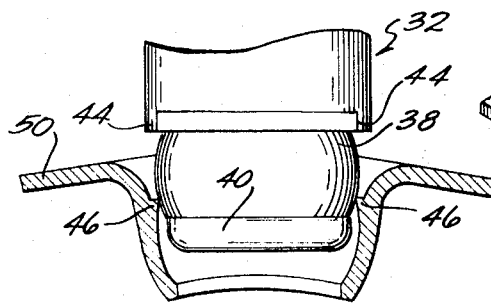
Figure 10:
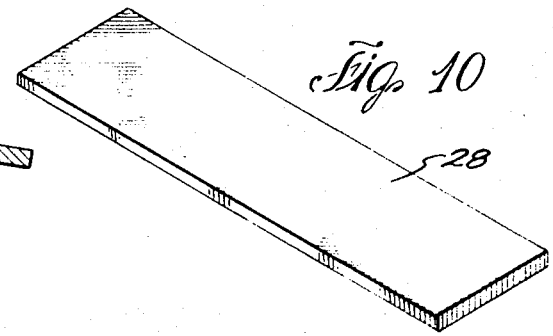
Figure 14:
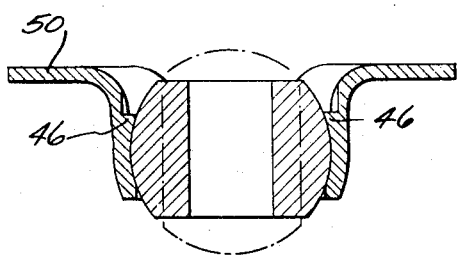
Figure 15:
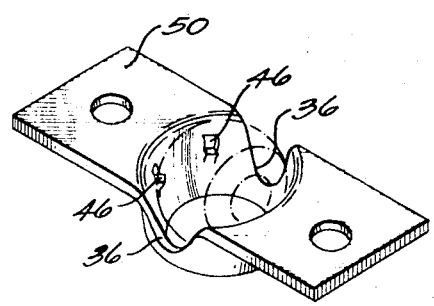

Other objects and advantages will be pointed out in, or be apparent from, the specification and claims, as will obvious modifications of the various embodiments shown in the drawings, in which:

FIG. 1 shows a flat strip prior to forming;
FIG. 2 shows the flat strip rolled into a ring;
FIG. 3 shows the ring of FIG. 2 carried on a punch assembly descending into the die;
FIG. 4 shows the punch assembly in the die just prior to the cold forging of the ring;
FIG. 5 shows the completion of the cold forging operation;
FIG. 6 shows the formed retainer removed from the mandrel and shows a ball bushing being assembled into the retainer;
FIG. 7 shows the completed assembly as it would be shipped by the manufacturer to the user for press-fit mounting;
FIG. 8 shows the manner in which the assembly is press-fit mounted reclosing the retainer;
FIG. 9 shows a variation on the foregoing where the retainer is made out of a longer strip to provide strap-type hanger for a bearing assembly;
FIG. 10 shows a flat strip which is used in the forming of a side flange retainer;
FIG. 11 shows the completion of the first step of forming the side flange retainer;
FIG. 12 shows the next step in the forming process whereby the bottom of the spherical cup has been punched out and the retaining lugs are sheared out of the interior surface of the retainer;
FIG. 13 shows the manner in which the retainer is spread open to remove the mandrel from the retainer, having spread the retainer in this manner it must be bent back to the flat condition;
FIG. 14 shows the manner in which the ball is mounted in the reflattened retainer; and
FIG. 15 is a perspective view showing the details of the retaining lug more clearly.

Considering the drawings now in detail, the flat strip shown in FIG. 1 is rolled to a ring-like form (FIG. 2) which is mounted on the mandrel 12 (FIG. 3). The mandrel has a spherical exterior surface to which the ring is to be conformed. The punch assembly 14 provides for some lost motion between the mandrel and the anvil portion 16 by reason of the space 18 between the upper end of the mandrel and the plug 20. In FIG. 3 as the punch assembly descends towards the die 22 the mandrel is in its down position with respect to the punch assembly and the ring blank 10 is mounted midway on the spherical portion, that is there is equal mass of the ring above and below a horizontal plane through the middle of the spherical mandrel. In FIG. 4 the ring blank has been advanced into the die and the cold forming operation is about to begin. As the anvil now starts the downward pressure, as shown completed in FIG. 5, it fully upsets or flows the ring to form around the mandrel. Any clearance between the O.D. of the spherical mandrel and the I.D. of the ring blank disappears at first and further downward pressure causes the metal ring to flow inwardly. It will be apparent that the blank tends to carry the mandrel and it is for this reason that the lost motion is provided between the mandrel and the anvil permitting the mandrel to float during this forming operation so that the finished ring or retainer will have equal upper and lower halves. At the completion of the cold forming operation shown in FIG. 5 the punch assembly 14 is withdrawn with the retainer solidly locked onto the mandrel. The mandrel can now drop down again which then separates the retainer from the bottom face of the anvil. At this point knives are inserted so that further upward movement of the punch assembly pulls the mandrel from within the ring and this, of course, causes the ring to spread open as may be seen in FIG. 6. The ring is spread sufficiently at this point so that it will not reclose of its own accord.

It is now a simple matter to insert the ball bushing 24 as shown in FIG. 6 and the assembly can be handled and shipped in the state shown in FIG. 7 where the facing ends of the retainer ring are still spread apart as necessary to remove it from the mandrel. It is interesting to note, however, that these facing ends are perfectly matched by reason of the cold forming operation to which they have been subjected. Therefore, when the assembly is press fitted into its mount 26 as shown in FIG. 8 the ends reclose to regain the perfect match. This match is so perfect that it, in effect, completes a solid ring which can be subjected to great pressure without causing any deformation of the ring and, hence, no binding of the ball.

FIG. 9 shows a variation on the foregoing method where a longer strip of metal is formed into a ring having projecting hangers and is then cold formed in an open sided die so as to allow hangers 26 to project radially. After the retainer is removed from the mandrel and the ball 24 inserted, the projecting hangers can then be spot welded together.

The side flange mounting for the ball bushing is fabricated by the method shown in FIGS. 10 through 15. In this method a flat strip 28 is placed over a suitable die 30 and the punch 32 is brought down as shown in FIG. 11. The side edges pull down and conform to the ball portion 38 of the punch to form contoured notches 36 in the cup part with the metal flowing into the cup. The punch also includes a spherical portion 38 and a projecting cylindrical portion 40. Therefore, as the punch moves into the die the notches 36 are formed and the strip is drawn into a cup-like form as shown in FIG. 11. Further movement of the punch into the die causes the cylindrical portion 40 to punch out the bottom 42 while the spherical portion 38 cold forms into a proper spherical shape up to about the midpoint of the spherical portion 38 of the punch. At the same time the projecting shears 44 cut into the metal and cold form it against the spherical portion of the mandrel above the midpoint to form retaining lugs or ears 46. These inwardly projecting ears have a spherical inner surface which will ultimately cooperate with and retain the ball bushing. At this point the metal blank has been so formed as to securely lock on the spherical portion of the punch but the contoured notches 46 facilitate bending the retainer as shown in FIG. 13 to release the retainer from the punch assembly. Since the retainer has been bent beyond its elastic limit to remove it from the punch it must now be reflattened by bending it back. After being reflattened the bushing ball can be mounted by positioning it as shown in FIG. 15 and then rolling it around in the normal manner. The end product is shown in FIG. 15 where the flanges 50 project from opposed sides of the retainer with the contoured notches 46 lying between the flanges and the formed ears and spherical lower cup portion retaining the bushing ball.

In any case the retainer is cold formed on a mandrel and then spread open to remove the retainer from the mandrel. The spherical surface formed by this operation results in a true surface for reception of the ball bushing which no longer need have a perfect surface to which the retainer can be matched. This, therefore, means the ball bushing can be fabricated by lower cost methods than heretofore permissible. Furthermore, since the ball bushing is not subjected to any forming pressures during formation of the retainer it can be made of any material desired.

Although various embodiments of the present invention have been illustrated and described, it will be apparent to those skilled in the art that various changes and modifications may be made therein without departing from the spirit of the invention or from the scope of the appended claims.

I claim:

1. The method of fabricating a ball bushing assembly comprising,
    forming a straight metal strip to cylindrical form,
    coining said cylindrical metal strip in a die and on a mandrel,
        the mandrel having a spherical contour to which the strip is conformed to an extent adequate to retain a ball,
        the die precisely determining the outside dimensions of the formed metal,
    removing the formed metal from the die, springing the formed metal open and withdrawing the mandrel,
    assembling a bushing ball into the formed metal strip which now functions as a retainer,
        the bushing ball having a spherical surface substantially conforming to the surface inside the retainer as formed,
    and mounting the assembled ball and retainer in a way forcing the retainer back to its original formed shape prior to being sprung.

2. The method of claim 1 in which the metal strip is first formed into a ring which is then formed on the mandrel with the ends of the strip in butting relationship, the ends being returned to butting relationship when the bushing ball has been mounted in the ring by press fitting the assembly into a hole dimensioned as the forming die.

3. The method of claim 2 in which the medial plane of the ring is substantially coplaner with the medial plane of the spherical contour of the mandrel prior to forming the metal to the mandrel.

4. The method of claim 2 in which the butted ends include radially projecting hanger portions and the cold forming on the mandrel is done in an open sided die receiving the hanger portions.

References Cited

UNITED STATES PATENTS

| 2,202,276 | 5/1940 | Venditty | 287—90 |
| 2,293,582 | 8/1942 | Whittingslowe | 287—90 |
| 2,382,349 | 8/1945 | Taylor. | |
| 2,787,048 | 4/1957 | Heim | 29—149.5 |
| 2,952,899 | 9/1960 | Glavan. | |

CHARLIE T. MOON, Primary Examiner

U.S. Cl. X.R.

29— 434, 445, 453, 525; 287—88; 308—72